(12) United States Patent
Whited

(10) Patent No.: US 9,483,878 B2
(45) Date of Patent: Nov. 1, 2016

(54) CONTEXTUAL EDITING USING VARIABLE OFFSET SURFACES

(71) Applicant: Disney Enterprises, Inc., Burbank, CA (US)

(72) Inventor: Brian Whited, Glendale, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 58 days.

(21) Appl. No.: 14/105,559

(22) Filed: Dec. 13, 2013

(65) Prior Publication Data

US 2015/0145857 A1    May 28, 2015

Related U.S. Application Data

(60) Provisional application No. 61/909,740, filed on Nov. 27, 2013.

(51) Int. Cl.
| | |
|---|---|
| *G06T 15/00* | (2011.01) |
| *G06T 17/00* | (2006.01) |
| *G09G 5/00* | (2006.01) |
| *G06K 9/36* | (2006.01) |
| *G06K 9/32* | (2006.01) |
| *G06F 19/00* | (2011.01) |
| *G06T 19/20* | (2011.01) |
| *G06F 3/0484* | (2013.01) |
| *G06T 11/60* | (2006.01) |
| *G06T 3/40* | (2006.01) |
| *G06T 17/20* | (2006.01) |
| *G06F 3/0485* | (2013.01) |
| *G06T 15/30* | (2011.01) |
| *G06Q 10/06* | (2012.01) |
| *G06T 19/00* | (2011.01) |
| *G09G 5/14* | (2006.01) |

(52) U.S. Cl.
CPC ............. *G06T 19/20* (2013.01); *G06F 3/0485* (2013.01); *G06F 3/04845* (2013.01); *G06K 9/32* (2013.01); *G06Q 10/06* (2013.01); *G06T 3/4038* (2013.01); *G06T 11/60* (2013.01); *G06T 15/30* (2013.01); *G06T 17/20* (2013.01); *G06T 19/00* (2013.01); *G09G 5/14* (2013.01); *G06T 2210/62* (2013.01); *G06T 2219/2004* (2013.01); *G06T 2219/2016* (2013.01); *G06T 2219/2021* (2013.01)

(58) Field of Classification Search
CPC ......... G06T 15/20; G06T 15/30; G06T 3/00; G06T 3/4038; G09G 5/14; G06F 3/0485; G06F 3/04845; G06F 17/50; G06K 9/32; G06Q 10/06
USPC ....... 345/419, 420, 427, 619, 622, 629, 672, 345/678–680; 382/277, 284, 295; 700/97, 700/98, 103
See application file for complete search history.

(56) References Cited

U.S. PATENT DOCUMENTS

| | | | | | |
|---|---|---|---|---|---|
| 5,511,157 | A | * | 4/1996 | Wang | 345/652 |
| 6,323,879 | B1 | * | 11/2001 | Sauerbrei | 345/672 |

(Continued)

*Primary Examiner* — Ke Xiao
*Assistant Examiner* — Andrew Shin
(74) *Attorney, Agent, or Firm* — Dorsey & Whitney LLP

(57) ABSTRACT

A method for editing content including at least one three-dimensional object. The method includes determining by a processing element one or more constraints, rendering by the processing element a shell defining an offset distance to the three-dimensional object corresponding to the one or more constraints, receiving a user input to a point related or connected to the three-dimensional object, and moving the point in a direction corresponding to the user input. In the method, the movement of the point is limited in at least one direction by the shell.

18 Claims, 15 Drawing Sheets

(56) References Cited

U.S. PATENT DOCUMENTS

2001/0055031 A1* 12/2001 Andersson .......... G06F 3/04845
　　　　　　　　　　　　　　　　　　　　　　345/653
2006/0290693 A1* 12/2006 Zhou et al. ................. 345/420
2007/0150247 A1* 6/2007 Bodduluri ........... G06F 19/3437
　　　　　　　　　　　　　　　　　　　　　　703/11
2009/0109217 A1* 4/2009 Mathews ................ G06T 19/20
　　　　　　　　　　　　　　　　　　　　　　345/420

* cited by examiner

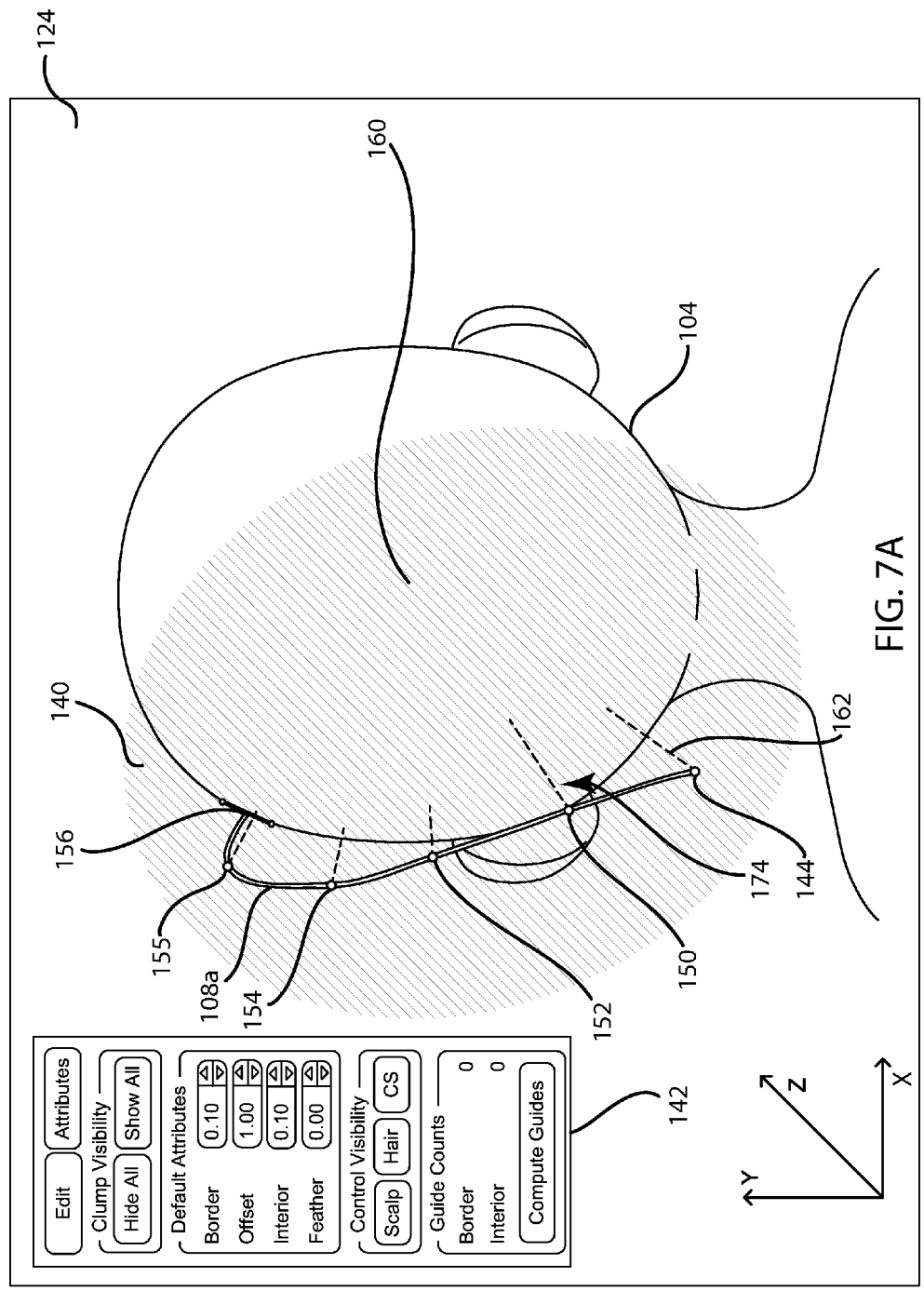

CONTEXTUAL EDITING USING VARIABLE OFFSET SURFACES

CROSS-REFERENCE TO RELATED APPLICATIONS

This application claims priority to U.S. Provisional Patent Application No. 61/909,740, filed Nov. 27, 2013, and entitled, "Contextual Editing Using Variable Offset Surfaces," which is incorporated herein by reference in its entirety and for all purposes.

FIELD

The present invention relates generally to computer graphics, and more specifically to editing of computer graphic objects.

BACKGROUND

Computer graphics are being used more frequently to create content, such as movies, video games, animations, and so on. Many times, objects such as a characters or scene elements, are illustrated in three dimensions in the content. Current editing techniques for these graphics use two-dimensional inputs (such a mouse moving over a display screen displaying the content) to edit the three dimensional content. This often requires a user to edit a point as desired, but then rotate the object or character to which the point is related or connected to in order to view the edited point relative to the object. In other words, because the input to the editor is in two dimensions, but the object being edited is three-dimensional, the position of the moved point may be difficult to ascertain. Typically, a user will then rotate or otherwise manipulate the object to a different view in order to determine the output of the edit. As the volume of the edits increases, for example, when creating movies or other longer length content, the continuous manipulation to determine the edits can be time consuming and user intensive.

It is with these shortcomings in mind that the present invention has been developed.

SUMMARY

One embodiment of the present disclosure may take the form of a method for editing content including at least one three-dimensional object. The method includes determining by a processing element one or more constraints, rendering by the processing element a shell defining an offset distance to the three-dimensional object corresponding to the one or more constraints, receiving a user input to a point related or connected to the three-dimensional object, and moving the point in a direction corresponding to the user input, where the movement of the point is limited in at least one direction by the shell.

Another embodiment of the disclosure may take the form a system for modifying one or more characteristics of a three-dimensional character. The system includes at least one input device configured to detect a user input and a display in communication with the at least one input device and configured to display the three-dimensional character and an output element, wherein the output element corresponds to the user input to the at least one input device. The system further includes a processing element in communication with the at least one input device and the display, the processing element configured to: render a relative surface at least in part corresponding to the three-dimensional character and move an element connected to or related to the three-dimensional character in response to the user input, where the movement of the element is defined in part by the relative surface.

Yet another embodiment of the disclosure may take the form of a graphical editing method. The method includes determining an element connected to a three-dimensional object to be edited, calculating by a processor a reference shell having a topography corresponding to the three-dimensional object and offset from the three-dimensional object by an offset distance, and displaying by a display the reference shell and the three-dimensional object.

BRIEF DESCRIPTION OF THE DRAWINGS

FIG. 7A is a front elevation view of another example of the graphical user interface of the editor a point is edited in 2D on a three-dimensional object.

SPECIFICATION

Overview

Figure 1:
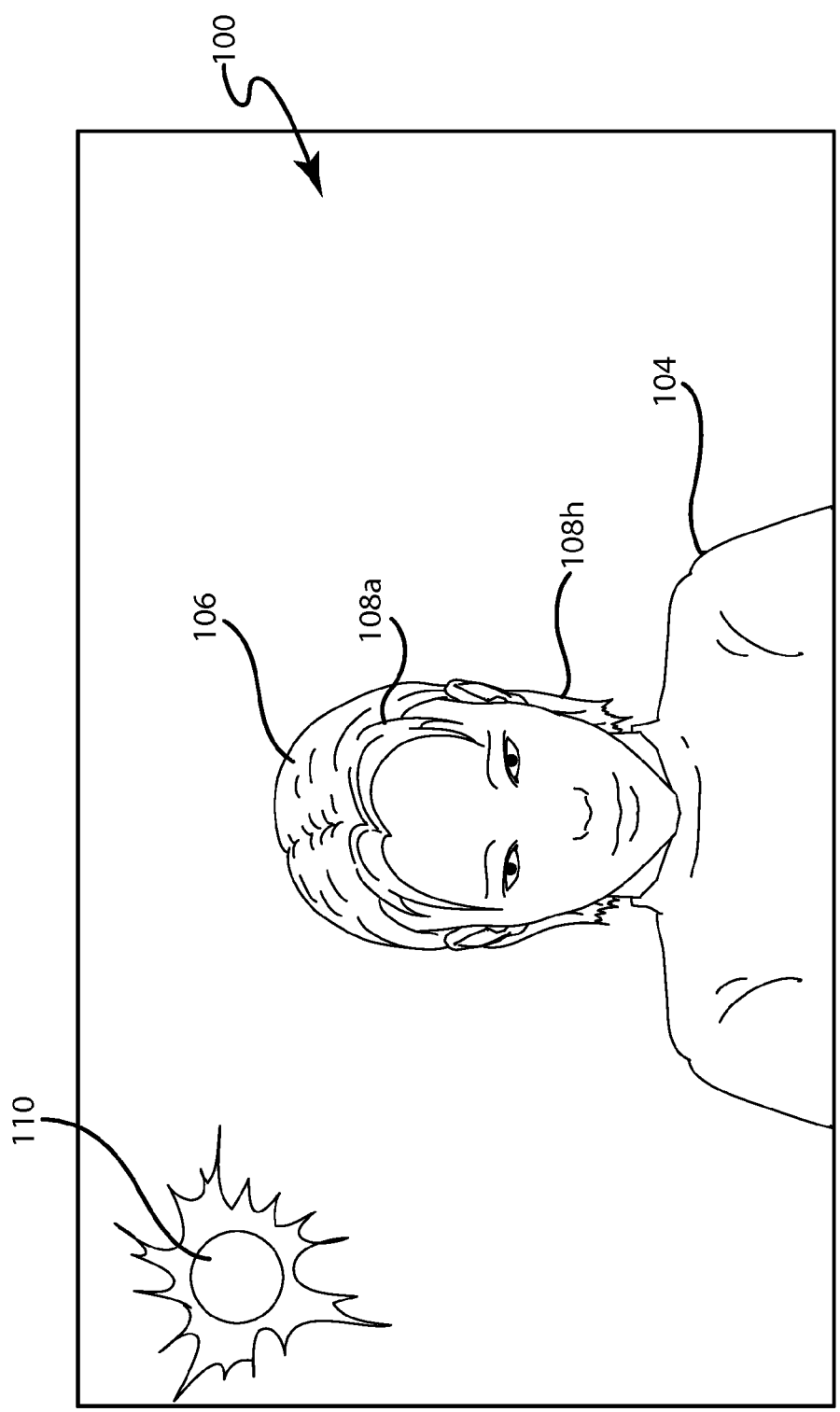
FIG. 1 is a front elevation view of content including one or more three-dimensional objects.

The present disclosure is related to an editing tool that allows two-dimensional (2D) and/or one-dimensional (1D) inputs to edit three-dimensional (3D) objects. The editing tool constrains movement of the inputs to relative locations on the 3D object, such that 3D effects on the object by editing the points in 1D and/or 2D is known or displayed to the user, without requiring the user to rotate or manipulate the edited object. In one example, the editing tool sets an offset distance from the object and movement of one or more points by the user are constrained by the relative distance or offset distance. In this example, as a point is moved by a user, the point is constrained during the movement. This prevents the point from moving in an unknown distance or direction, such as a in a z direction, when the input movements are in the x and y directions. In a first example, movement of the point is constrained in 2D and the point is able to only move in 1D, such as along the z axis. In this example, the distance of the point along the z axis changes, but its location along the x and y axes remain the same. In a second example, movement of the point is constrained in 1D and the point is able to move only in 2D, such as along the x and y axes. In this example, the distance of the point relative to the object remains constant, while allowing its horizontal or vertical location to change.

In some examples, the offset distance is selected as a set distance away from the surface of an object being edited. For example, the offset distance may define a shell, plane, or other surface spaced apart from and generally tracking the topography of the object. The shell may exactly correspond to the surface of the object, i.e., every point of the shell may be located at a distance of x from its corresponding point on the object surface. Alternatively, the shell may approximately correspond to the surface of the object, e.g., the average distance of a group of points is a distance of x from the object surface, but each point may vary in its distance from a corresponding point on the surface of the object. The variability of the shell may be selected by the user or be determined by the editing tool. This variability allows different editing effects for points on the object, as will be discussed in more detail below.

Using the editing tool a user can move a point, a group of points, or one or more lines, along one or two dimensions. As the user moves the point, group of points, and/or one or more lines, the movement of the moving element follows the gradient of the shell, which defines at least one limit for the movement. Because the moving elements are constrained in at least one dimension or direction, the one or more elements can be edited while maintaining the context relative to a reference object. As the context is maintained, the need to rotate the 3D view of the object to better observe the relative positions of the moved element is reduced as compared to conventional editing programs.

In some embodiments the editing tool may display the shell overlaid on the object. For example, shell may be drawn as a transparent or semi-transparent shape over the object. This provides visual context to the user illustrating the applied constraints. The shell may be visible at or around a set location from a point to be edited or may be visible around a portion or the entirety of the object. Other types of visual outputs may be used to indicate the constraints applied by the editing tool. For example, a movement axis illustrating the movement of the point along the x, y, or z axis may be displayed while the user is moving in a particular dimension.

DETAILED DESCRIPTION

Figure 2:
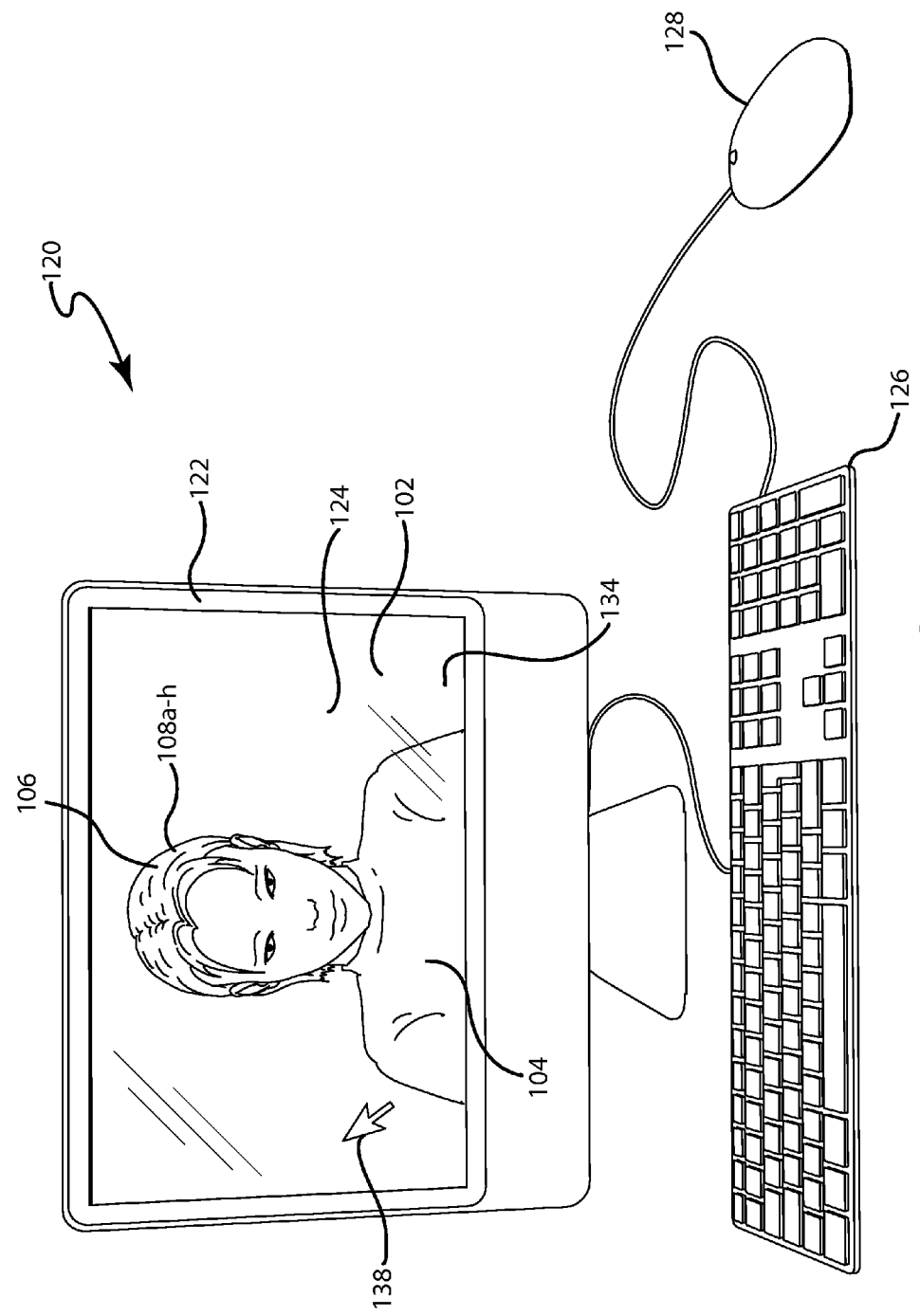
FIG. 2 is a front perspective view of a system for editing the one or more three-dimensional objects of the content.

Turning now to the figures, a system for editing content will now be discussed in more detail. FIG. 1 is a front elevation view of content including one or more editable objects 104, 106, 108a-108n, 110. FIG. 2 is a perspective view of a system 120 for editing the content 100 of FIG. 1. With reference to FIG. 1, the content 100 is a visual output including displayable objects, the objects may be related or otherwise connected to one another. For example, the content 100 may be a movie or video where a first object 104 is a character including hair 106 with one or more individual hair strands 108a-108n. The content 100 may also include scene elements, such as the sun 110. In FIG. 1, the hair 106 may be editable as a collective group and/or each individual strands 108a-108n or groups of stands may be editable on their own. Each of the objects or elements 104, 106, 108a-108n, 110 of the content 100 may be represented in the content 100 as having a 3D appearance. For example, each element 104, 106, 108a-108n, 110 may have a length, height, and depth (e.g., values along the x, y, and z axis). The 3D appearance of the objects allows them to appear more lifelike. It should be noted that the various content elements 104, 106, 108a-108n, 110, may generally be referred to herein as content objects, elements, points, or the like.

Although the content 100 in FIG. 1 is illustrated as being a video, many other types of content may be edited using the system 120 of FIG. 2. In particular, substantially any type of visual content such as photographs, animations, image data, and/or other types of computer created or editable graphics may be edited using the system 120 of FIG. 2. As such, the discussion of any particular type of content, e.g., movie, is meant as illustrative only. Further, although the objects in the content are discussed as being three-dimensional it is meant that they are drawn to represent a three-dimensional shape, such as by using different graphic techniques, etc.

The system 120 of FIG. 2 may be used to edit the content 100. With reference to FIG. 2, the system 120 includes a computer 122, one or more input devices 126, 128, and a display 134. The system 120 is used to display the content 100 (or select elements therefrom) and using inputs, such as from a user, selectively edit the content 100.

Figure 3:
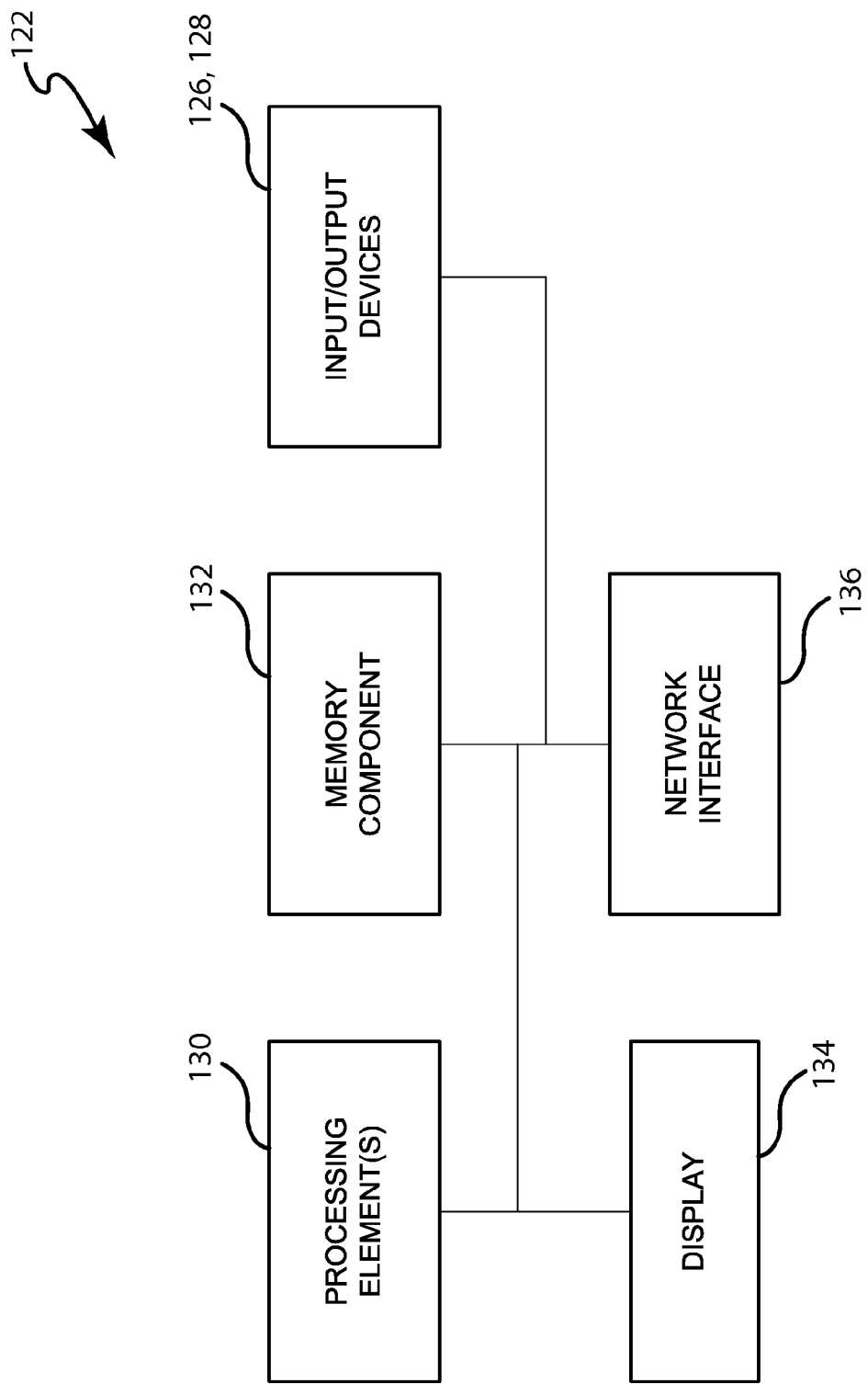
FIG. 3 is a simplified block diagram of a computer of the system of FIG. 2.

FIG. 3 is a block diagram of the computer 122 of the system 120. With reference to FIG. 3, the computer 122 may be integrated with the one or more input devices 126, 128 and/or display 134 or may be separate from each and in communication through a network (e.g., WiFi, Internet, Bluetooth, Ethernet, Universal Serial Bus, or the like) or other communication mechanism. In computer 122 may include one or more processing elements 130, one or more memory components 132, and a network interface 136. Additionally, the computer 122 may include the display 134 and input/output elements 126, 128 or may be in communication therewith.

The one or more processing elements 130 may be substantially any device capable of processing, receiving, and/or transmitting instructions. For example, the one or more processing elements 130 may be a microprocessor or microcomputer. Additionally, it should be noted that in some embodiments select components of the computer 122 may be controlled by a first processor and other components of the computer 122 may be controlled by a second processor where the first and second processors may or may not be in communication with one another.

The one or more memory components 132 store electronic data that may be utilized by the computer 122. For example, the memory component 132 may store electrical data such as the content 100 or one or more audio files, video files, document files, and so on, corresponding to various applications. The memory component 132 may be, for example, non-volatile storage, a magnetic storage medium, optical storage medium, read only memory, random access memory, erasable programmable memory, or flash memory.

The network interface 136 facilities communication between the computer 122, one or more components of the system 120, as well as other electronic devices (e.g., other computers). For example, the network interface 136 may receive data from one or more electronic components or devices, as well as facilitate transmission of data to one or more electronic components or devices. For example, the network interface 136 may be used to receive data from a network, or may be used to send and transmit electronic signals via a wireless or wired connection (Internet, WiFi, Bluetooth, and Ethernet being a few examples). In some embodiments the network interface 136 may support multiple network or communication mechanisms. For example, the network interface 136 may pair with another device over a Bluetooth network to transfer signals to the other device while simultaneously receiving data from a WiFi or other network.

The display 134 may be integrated with the computer 122 (as shown in FIG. 2), such as a tablet computer, or may be separate from the computer 122, such as a stand-alone monitor. The display 134 displays one or more output images and/or videos and is used to display the content 100 to be edited by the system 120. The display 134 may be substantially any type of display screen such as a liquid crystal display, plasma display, light emitting diode screen, or the like. Additionally, in some embodiments the display 134 may include one or more input components. For example, the display 134 may include one or more sensors to detect input signals as a user touches the display 134 either through a finger or an input device such as a stylus.

The input devices 126, 128 are used to provide input to the computer 122. In some embodiments, the first input device 126 may be a keyboard and a second input device 128 may be mouse or track pad. Although the input devices 126, 128 are illustrated as a keyboard and mouse, the computer 122 may use substantially any type of input device, such examples of which include a joystick, stylus, track pad, handheld controller, or the like. Additionally, as briefly discussed above the display may include one or more sensors to detect and input and may be used as an input device, e.g., a capacitive touch screen or the like. Accordingly, the discussion of any particular input device is meant as exemplary only.

The input devices 126, 128 are in communication with the display 134 and the processing elements 130 and enable a user to provide input to the computer 122. The input devices 126, 128 allow a use to input gestures or other inputs to the system 120 that may be used to edit the content. For example, the input devices 126, 128 allow the user to manipulate the elements 104, 106, 108*a*-108*n*, 110 of the content 100 in order to edit or otherwise vary the content. In some embodiments, the input devices 126, 128 may have a corresponding output that provides the user with feedback regarding his or her input. For example, a cursor 138 or other movable icon provides output on the display 134 and moves correspondingly to inputs by the first and/or second input devices 126, 128. Continuing with this example, as the user moves the second input device 128 in the x or y directions, the cursor 138 may move correspondingly across the display 134 in the x or y directions. Additionally or alternatively, when select inputs on the first input device 126 are activated, the one or more characteristics of the cursor 138 may be varied. For example, when the user presses a first key the cursor 138 may increase in size and/or change color in order to indicate to the user that a particular mode has been selected. The change in characteristics of the cursor may be used to provide output to the user regarding the current mode of the editing tool (e.g., 1D or 2D gesture mode).

Figure 4:
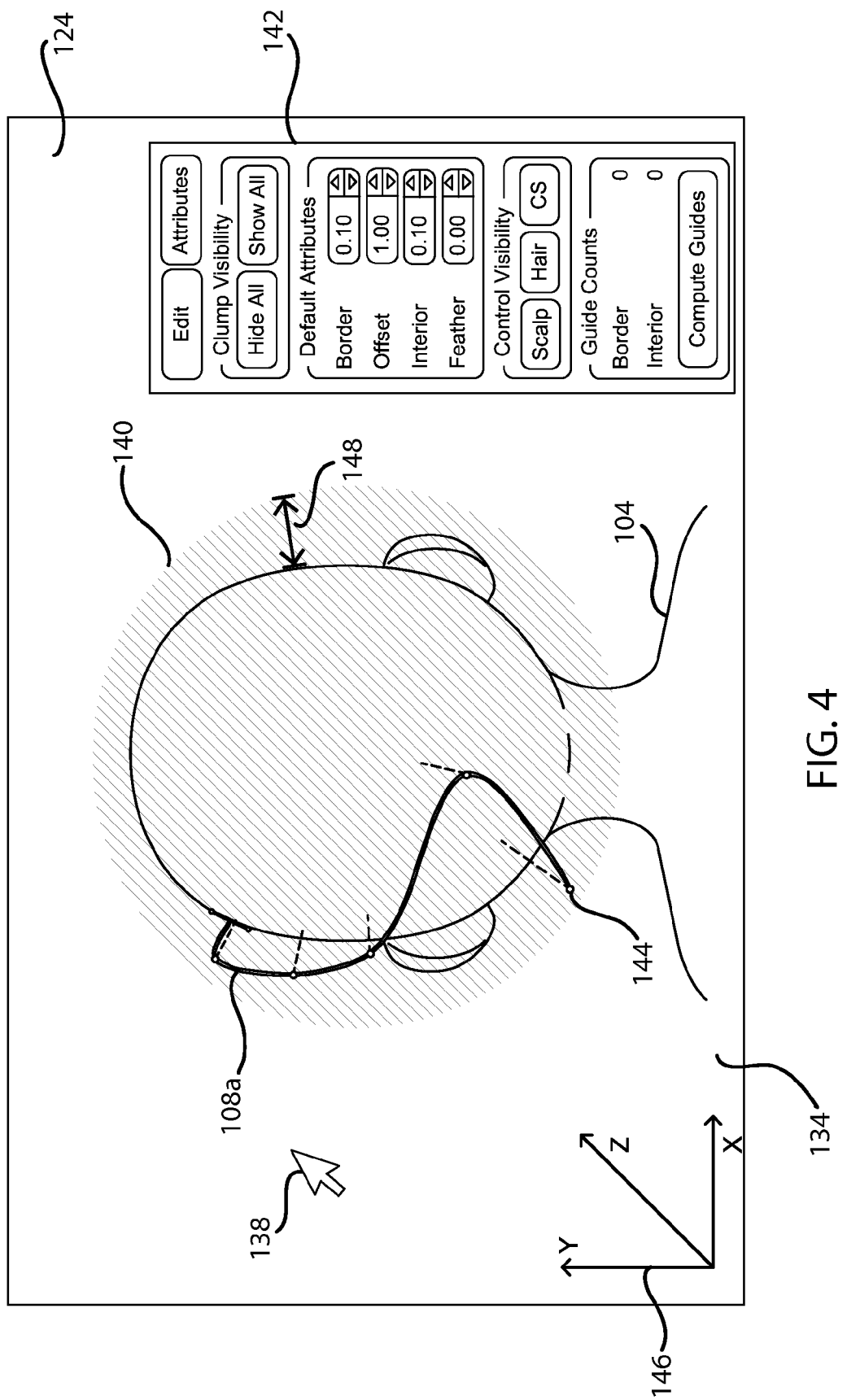
FIG. 4 is a front elevation view of a graphical user interface as an editor of the system of FIG. 2 modifies a three-dimensional object of the content.

The editing tool of the system 120 will now be discussed in more detail. FIG. 4 is a front elevation view of the editor 124 modifying an element of the content 100. With reference to FIG. 4, the editor 124 includes a graphical user interface (GUI) 146 that displays the elements or objects to be edited. In the example of FIG. 4, the stand of hair 108*a* of the character 104 is shown as being edited. As shown in FIG. 4, the hair 108*a* may include one or more points 144 that, when moved, effect one or more characteristics of the hair 106 volume. In this example, the hair is related to or otherwise connected to the character 104.

With continued reference to FIG. 4, the editor 124 defines a reference shell 140 around the character 104 or a portion thereof. The reference shell 140 defines a constraint surface or plane that is defined at a spacing distance 148 away from an outer surface of the character 104. The reference shell 140 may be determined by a distance field calculation executed by the processing element 130. The reference shell 140 may form a 3D grid surrounding the object to be edited, such as the shell 140 surrounding the character 104 in FIG. 4. The reference shell 140 may generally correspond to the outer surface of the object 104 (e.g., replicate the topography), however the correspondence relationship may be varied as desired by the user. For example, in instances where the underlying object is convex each point of the shell 140 may be located at the spacing distance 148 from the point at its corresponding location, i.e., a direct 1:1 correspondence between the shell and the object. In this example, the spacing distance 148 may be substantially the same between the outer surface of the character and the shell. In another example, the topography of the shell 140 may roughly or less accurately approximate the topography of the character 104 and the spacing distance 148 may be approximated for each point on the shell 140. In this example, the processing element 130 can compute the shell 140 faster as it may approximate the location for each point of the shell 140, rather than calculating the location of each particular point. However, in some instances a direct 1:1 correspondence may be desired and provide more detail for the content 100 to be edited. Additionally, the shell 140 may be manually set by the user, such as by the user dragging the cursor 138 around the character 104 at a select distance to define the shell 140. Alternatively or additionally, the user may vary select locations of the shell 104, either manually or by setting a different spacing distance 148 for those areas and using the processing element 130 to calculate the shell 140.

In some embodiments, the GUI 146 may display the shell 140 overlaid on top of the character 104. For example, as shown in FIG. 4, the shell 140 is positioned over the character 104 and is transparent or partially transparent. This allows the user to view the shell 140 while still being able to view the object 104 underneath. This visibility provides the user with the ability to see the corresponding location on the character 104 of points on the shell 140. It should be noted that although the shell is shown overlaid on the object, the shell need not be displayed or may be displayed in other manners. In particular, the shell may be used for calculations by the processing device is determining the end movement of a point and may not be apparent to the user. In other examples, the shell may not appear until the user is manipulating a point, in this example, the shell becomes visible at select locations and times during the editing process.

With continued reference to FIG. 4, a strand of hair 108*a* is displayed relative to the shell 140. The hair 108*a* includes a plurality of points 144 and each point 144 may be edited with the editor 124 either by itself for with a group of other points. For example, the entire strand 108*a* may be edited as a continuous line or select points on the strand may be edited relative to the remaining points on the strand.

The point 144 is movable along the surface of the shell 144 and to edit the point or points the user provides input to the computer 122 to move the point along the shell (e.g., by selecting the point and dragging it across the display 134). However, the shell 144 restrains movement of the point 144 in certain directions.

In a first example, the shell 140 may also define a curve normal to the surface of the object 104 for each editable point 144, 150, 152, 154. It should be noted that the curve may appear as a line for simplex geometries, but in more complex instances will be shown as a curve. The normal curve is defined by tracing the point from its location on the shell down to the surface 160. Alternatively, the curve is defined by tracing upwards from the points location on the surface towards the shell 140. In either example, the curve is defined by following the gradient of the distance field where a negative gradient is towards the object and positive gradient is away from the object. The end points of the curve will be normal to both the object and the point on the shell. In particular, the normal curve is perpendicular to the outer surface of the object 104 at the location of the point and is perpendicular to the shell 140 at the corresponding location of the point on the shell. As will be discussed in more detail below, during 1D movement the shell 140 moves along the normal curve while the point 150 is being edited. However, the point is connected to the shell and thus its location relative to the other points and the object in the x and y directions (or other constrained directions) remains the same. Thus, the shell defines a path (along the normal curve) along which the point can move when edited by a user.

In a second example, the shell 144 defines an offset distance from the object 104 that the point 144 can be moved. For example, the shell 144 may define the furthest distance from the object 104 in one dimension that the point 144 can be positioned. The distance varies based on the location of point, e.g., in a first location the offset distance may be greater than at a second location. The distance and constrained dimension is variable. Examples of moving points 144 relative to the object and shell 140 using the editor 124 will be discussed in more detail below with respect to FIGS. 6A-7E.

The GUI 146 may include one or more control icons, such as a control window, to provide output to the user and allow the user to change one or more characteristics of the editor 124 and editing parameters. For example, a first control window 142 may be displayed as part of the GUI 146 and displays the current characteristics for the editor 124 (e.g., sensitivity, size of border, shell transparency, etc.). Additionally, the window 142 includes inputs for the user to enter values for one or more characteristics of the editor 124. This allows the user to customize the editor 124 as desired. As shown in FIG. 4, characteristics such as the border, offset, interior, and feather are displayed and optionally editable by the user. These characteristics may be used to vary one or more parameters of the object being edited. For example, in some instances the characteristics vary the density of the guide hairs that are used to control movement of one or more hairs or clumps of hair. Additionally, the control window 142 can include characteristics that affect the sensitivity of the shell 140. For example, the number of grids or guide counts for both the border and the interior of the shell 140 are displayed in the control window 142 and can be changed by the user.

Figure 5:
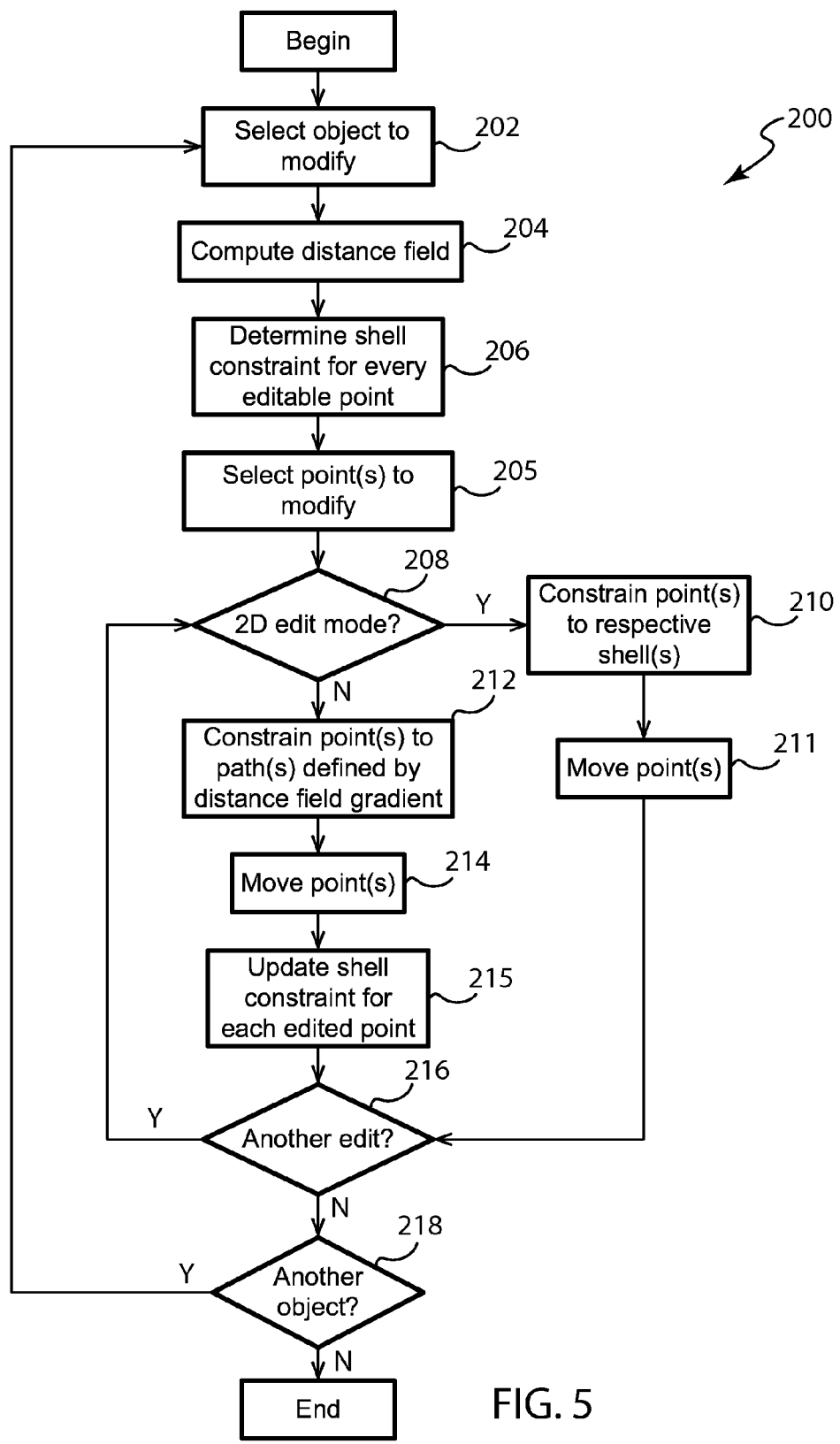
FIG. 5 is a flow chart illustrating a method for editing content.

A method for using the editor 124 and system 120 for editing content will now be discussed. FIG. 5 is a flow chart illustrating a method 200 for editing content 100 using the editor 124. With reference to FIG. 5, the method 200 may begin with operation 202 and an input selecting an object to be modified is received. For example, the user may provide input to the computer 122 through one of the input devices 126, 128 indicating a select object in the content 100 that the user wishes to edit. In the content 100 illustrated in FIG. 1, the user may select one or more strands of hair 108a-108n of the character 104 to be modified using the editor 124. In this example, the content 100 may be stored on the memory components 132 and using the cursor 138 the user selects the desired object. However, in other embodiments, the object may be selected in other manners and the content may be streamed to the computer 122 or only portions thereof may be stored on the memory component 132 of the system 120.

After operation 202, the method 200 may proceed to operation 204. In operation 204 the processing element 130 computes the distance field for the object selected in operation 202. The distance field determines the spacing distance 148 for the reference object, in this case the character 104, that will be used to render the shell to limit movement of the hair 108a-108n. The distance field may be determined based on one or more defaults programmed into the editor 124, may be generic for each object 104, 106, 110 in the content 100, and/or may be selected by the user. In instances where the user may select the distance field, the user may provide a numerical input (e.g., X distance from the object) and/or the user may indicate a distance using the cursor 138 by tracing around the character 104. Other types of input mechanisms are also envisioned, e.g., the user may use his or her finger or a stylus to directly trace on the display 134 to indicate the distance field. The distance field may also be selected based on desired sensitivity for the editor 124. For example, the distance field determines the number of grid lines used for the shell 140 and selecting a lower resolution will reduce the number of points for the grid and thus the shell may not include a topography that exactly matches the character 104.

The distance field will control the movement of the points edited by the user and may be varied to create different output from the editor 124 as desired. In instances where hair 108a-108n is being modified, the distance field may roughly approximate the outer surface of the character 104 where the hair 108a-108n is located, e.g., the top and/or sides of the character's 104 head. This approximation may have a reduced sensitivity to the topography of the head and certain locations, e.g., the ears, may not be fully represented/replicated on the shell 140. In this example, as a user moves the hair 108a-108n over the location of the shell 140 corresponding to the ears, the hair 108a-108b will move along the lower resolution of the shell and may obscure details of the ear as it may fall over the general outer surface of the ear without falling into the various contours of the ear.

The lower resolution of the shell 140 may allow the shell to be rendered more quickly by the processing element 130 and may create a desired artistic output (e.g., the hair may be meant to hide or obscure certain details such as when a character's hair is down the shape of the ears may not be desirable to be shown through the hair). However, in some instances a higher resolution may be desirable. For example, in instances where the hair 108a-108n represents fur on the face of a character, the higher resolution allows the hair to be moved by the a user and correspond to the finer details of the character, such as along the character's nose, etc. Accordingly, the distance field may be selected and varied based on a desired output for the modified content.

Once the distance field has been determined, the method 200 proceeds to operation 206. In operation 206 the processing element 130 determines the shell constraints for the editable points. In some embodiments, the processing element 130 uses the distance field to render a 3D grid surrounding the character 104 (or a portion thereof). The shell 140 constraints for each editable point determines the movement allowed for each point and based on the distance field determination may be different for each point.

Additionally, the location and size of the shell 140 may be varied as desired. The rendered shell 140 may be displayed on the GUI 146, such as an overlaid grid, color, highlight, or other representation positioned over the object 104. The display characteristics of the shell 140 may be selected to allow the character 104 to be visible through the shell 140, while still allowing the general characteristic of the shell 140 to also be visible. However, in some embodiments, the shell 140 may not be visible to the user and may act to restrain the movement of the edited elements without providing a visual indicator to the user.

With continued reference to FIG. 5, once the shell constraints for the editable points have been determined, the method 200 may proceed to operation 205. In operation 205, the point or points to be modified are determined. For example, the processing element 130 may receive input from the user (e.g., through the one or more input devices 126, 128) indicating the points that the user wishes to edit.

Once the point or points to be modified are selected, the method 200 proceeds to operation 208. In operation 208 the processing element 130 may determine the type of movement the user wishes to utilize for the hair 108a-108n. For example, the user may select between 1D and 2D movements. The type of movement selected determines the types of constraints that may be applied to the point(s) to be edited. The user may select different movements by providing input to the computer 122 via the input devices 126, 128. In one example, the editor 124 may have a default of 2D movement, constraining the point in one dimension and in this example the user may press a key on the input device 126 to toggle between different modes. Other input examples include selectable icons, right or left clicks through a mouse, inputs through the display 134, or the like. Substantially any type of input mechanism may be used.

If in operation 208, 2D movement is selected, the method 200 then proceeds to operation 210. In operation 210 the processing element 130 constraints the points to their respective shells 140. In particular, the processing element 130 limits movement of the point or points to two dimensions. For example, the processing element 130 may restrain or prevent movement of the points along the z axis (e.g., depth). In this example, the user can move the point in the x or y directions, but movement in the z direction may be limited, prevented, or predefined. The constrained dimension may be along any axis as desired and the z axis is used as illustrative only.

Once the desired movement has been constrained after either operations 210, the method 200 may proceed to operation 211. In operation 211, the processing element 130 moves the selected point, e.g., a point along the hair strand 108a-108n selected for editing, to correspond to a user input.

In 2D mode a 2D gesture (e.g., moving the mouse in a particular pattern corresponding to a desired movement), and the selected points are moved relative to the reference object, e.g., the character 104, by moving along the surface of the shell 104. In embodiments where the shell 140 is a zero-level-set at a constant distance from the original surface of the character 104, the point is able to move in the x or y directions, but at a select distance from the character 104. That is, the point may remain at approximately the same distance from the character 104 while being moved by the user across the display 134. The editor 124 allows the user to provide 2D inputs (e.g., via movement of the mouse) and translate those inputs to 3D inputs, while maintaining the context relative to the reference object, character 104. This reduces the need for the user to rotate the 3D view of the character 104 to better observe the relative position of the edited point to the character 104 in 3D.

If 2D movement is not selected in operation 208 and 1D movement is selected, the method 200 may proceed to operation 212. In operation 212, the processing element 130 is configured to restrain movement of the point or points in 1D. In particular, the processing element 130 constrains the points to the path or paths defined by the distance field gradient. For example, in operation 210, the processing element 130 limit the movement of the point such that most user movements of the point result in the point being moved towards or away from the character 104. In one example, the movement of the point is limited to movement along the z-axis (e.g., depth) and using inputs such as movement along the y axis, the movement is translated into movement in the z direction. In this example, the point may move along a curve normal to the surface of the object to move towards or away from the object. However, it should be noted that other axes may be selected as the available movement axis and the z axis is just one example. Optionally in this operation the editor 124 may display a reference axis illustrating the z axis to provide a visible indicator to the user regarding the selected movement of the It should be noted that movement in operations 210 and 212 being described as being limited is meant to describe that the movement in a particular axis may be predetermined by the shell. In other words, a point may be moved along a particular axis due to inputs by the user, but the movement of the point along the select axis or axes is predefined by the shape and topography of the shell. As an example, the point may be "stuck" to the shell and as it is moved by the user the point moves correspondingly with the topography of the shell. As another example, during 1D movement, the point moves along a path defined by a curve normal to the point on the shell corresponding to the point on the object.

Once the desired movement has been constrained after either operation 212, the method 200 may proceed to operation 214. In operation 214, the processing element 130 moves the selected point, e.g., a point along the hair strand 108a-108n selected for editing, to correspond to a user input.

In 1D mode a user inputs a 1D gesture, such as by moving the input devices 126, 128 in a way to move vertically or horizontally. As the user moves, the point is dragged toward or away from the reference object (e.g., character 104). However, the movement of the point follows the gradient of the distance field of the shell 140 such that the movement of the point maintains its context relative to the character 104. That is the point is constrained to a path defined by the distance field gradient, e.g., a curve normal to a corresponding point on the outer surface of the object and the point on the outer surface of the shell. This operation allows the user to input one dimensional inputs to the computer 122 and those inputs are translated into 3D movement. In particular, because movement on select axes can be constrained, the can understand how a particular movement in the 1D display field of the display 134 is translated into the 3D content 100.

After operation 214, the method 200 may proceed to operation 213. In operation 215 the processing element 130 updates the shell constraint for each edited point. For example, after a point or set of points have been modified by the user the processing element 130 updates the shell 140 constraints based on the new position of the edited points. As will be illustrated in more detail below, the position of the shell 140 is updated based on the new position of the location of the points. In other words, as the user moves the points towards or away from the object, the shell 140 is repositioned correspondingly.

After operation 211 and 215 and the selected point or points have been moved corresponding to the user input, the method 200 may proceed to operation 216. In operation 216 the processing element 130 determines whether there is a change in desired movement. For example, the processing element 130 determines whether the user has decided to switch between 1D and 2D movement or otherwise vary the constraints applied to content 100. As a specific example, in instances where the editor 124 may toggle between 1D and 2D movement based on whether a particular key on the input device 126 is selected, in instances where the user releases the key, the processing element 130 may determine that there has been a change in movement. Alternatively or additionally, the user may select additional points, such as a plurality of points along the hair strand 108a-108n. If in operation 216 the movement has changed, the method 200 may return to operation 208 and the desired movement for the points is determined. However, if in operation 216 there is no change in movement, the method may proceed to operation 218.

With continued reference to FIG. 5, in operation 218 the processing element 130 may determine whether a user wishes to edit another object. For example, once the user has moved the selected points of a particular hair strand 108a-108n as desired, the user may wish to modify another hair strand 108a-108n. The user may provide input to the computer 122 via the one or more input devices 126, 128 to indicate that another element is to be edited. If another element is going to be edited, the method 200 may return to operation 202 and the object and/or element connected to or related to the object is selected. If another object is not desired, the method 200 may proceed to operation 220 and reach an end state.

Figure 6A:
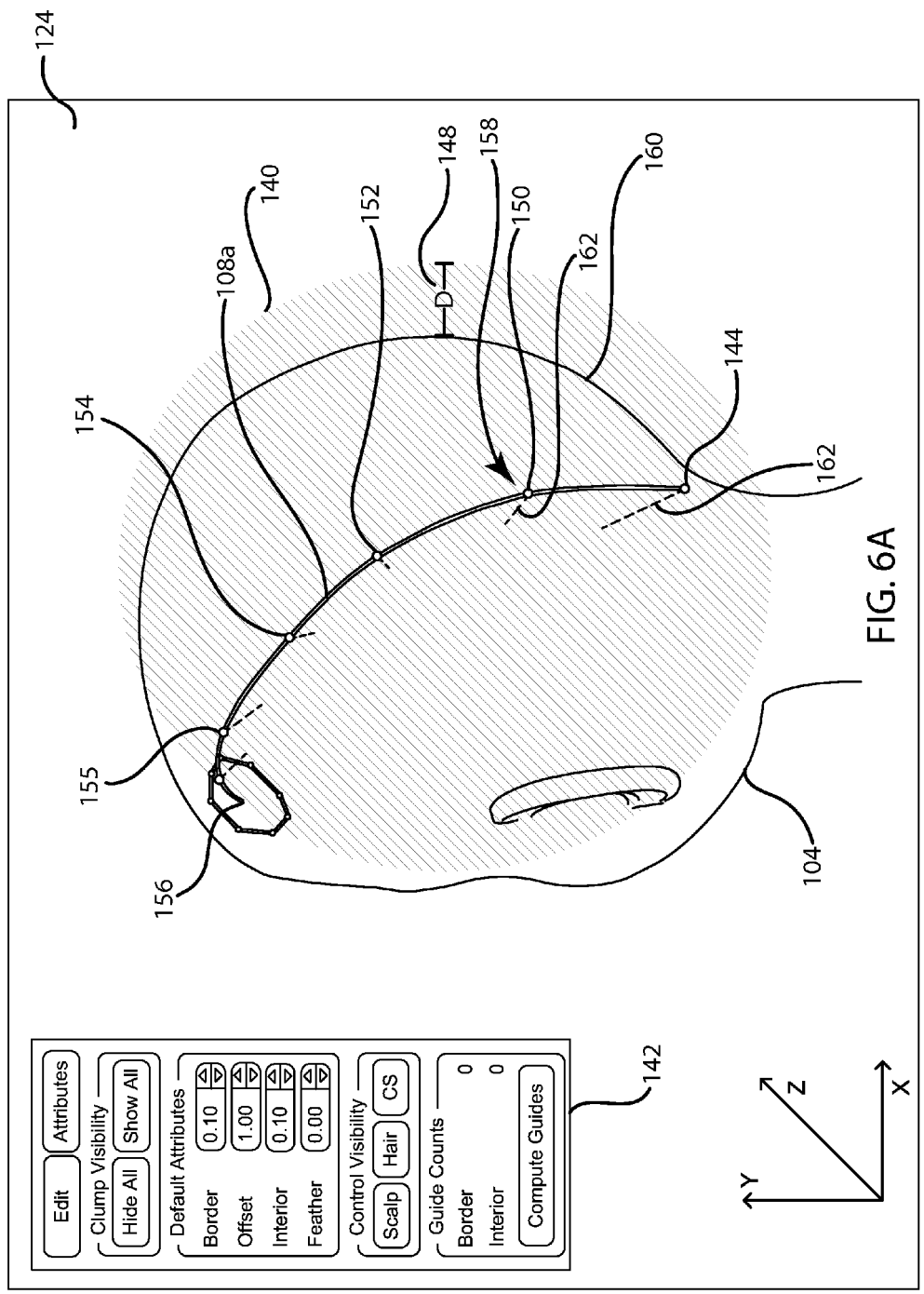
FIG. 6A is a front elevation view the graphical user interface of the editor as a point is edited in 1D relative to a three-dimensional object.

Examples of a point being edited with the editor 124 will now be discussed. FIGS. 6A-6D illustrate views of the editor GUI while a point is moved from a first location to a second location during 1D mode. With reference to FIG. 6A, the 3D character is illustrated in a perspective view with the reference shell 140 transposed on top of the character 104. As shown in FIG. 6A, the reference shell 140 extends past the outer surface 160 of the character 104 by the spacing distance 148. A selected hair strand 108a extends from an anchor point 156 towards an end point 144. In this example, the hair strand 108a includes a plurality of points 150, 152, 154 between the anchor point 156 and the end point 144. The point 150 in FIG. 6A is positioned at a first location 158. Each point may include a reference line 162 extending between the point 144, 150, 152, 154, 155 and the outer surface 160 of the character 104. The reference line 162 may form a curve normal to the corresponding location of the point on the outer surface 160 of the character 104. The curvature of the reference line 162 depends on the geometry of the outer surface of the object. The number of points and reference lines may be varied as desired.

Figure 6B:
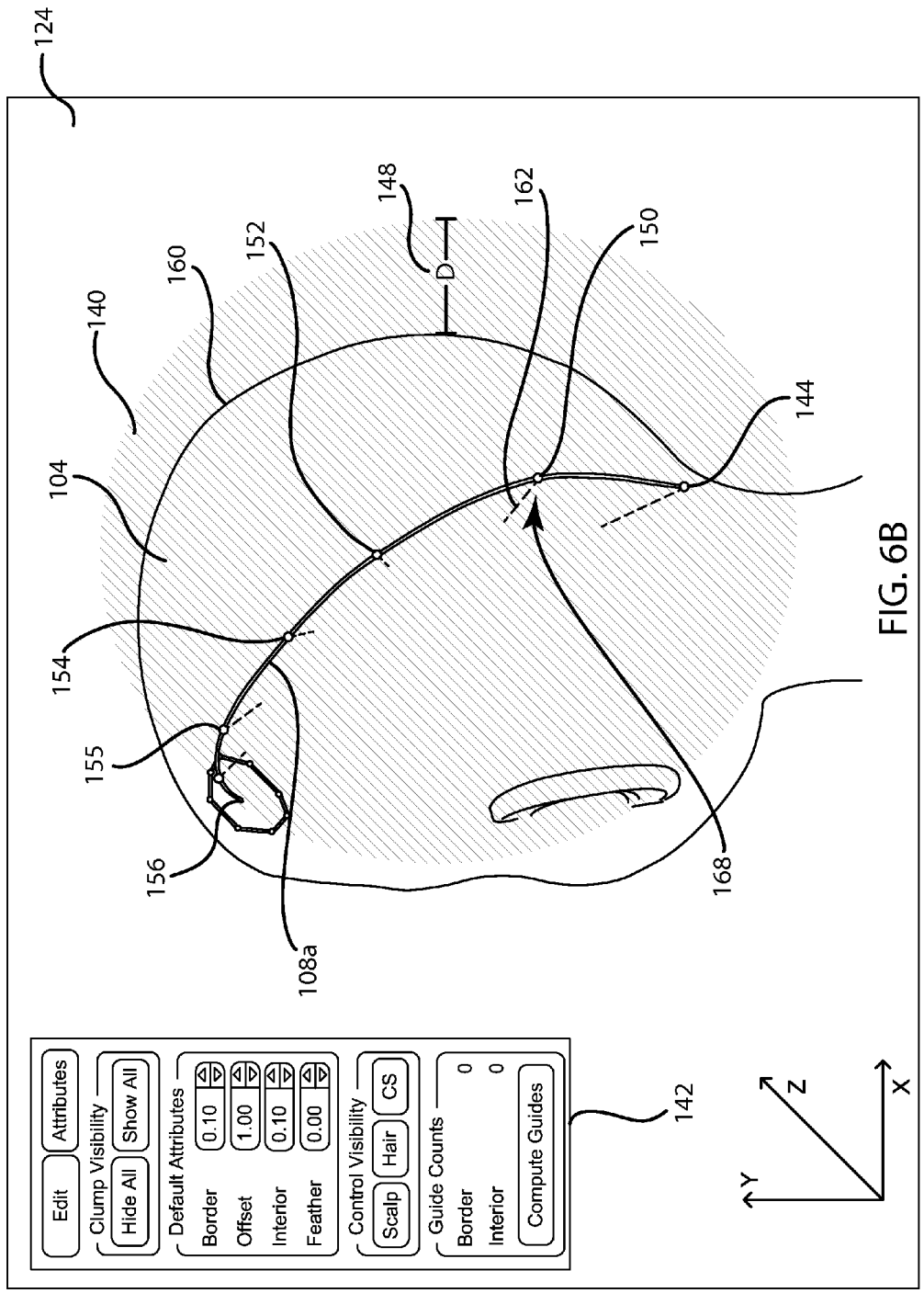
FIG. 6B is a front elevation view of the graphical user interface of FIG. 6A with the point in a second location.

With reference to FIG. 6B, the editable point 150 is moved during a 1D motion mode. For example, while in the 1D mode, the user may drag the point 150 from the first location 158 illustrated in FIG. 6A to a second location 168 as shown in FIG. 6B. As the user moves the point 150, the point 150 moves along a path defined by the distance field gradient. For example, as the user moves the point 150, the point 150 moves along a path defined by the reference line 162 and the reference line 162 increases or decreases based on the position of the point 150. That is, the line 162 defines the path of movement for the point 150 and the point 150 is constrained to movement along that path. As the point 150 moves in the y direction, such as due to a user's movement of the mouse in the y direct, the reference line 162 will become shorter and the point 150 will move closer to the outer surface 160 of the object 104 (i.e., move in the z direction). As the point 150 moves in the x direction, the point 150 moves along the path of the reference line 162 away from the outer surface 160 of the object 104 (i.e., in the z direction) and the length of the reference line 162 (connecting the point to the outer surface of the object) extends. The reference line 162 is normal to both the corresponding point on the outer surface of the object and the point on the shell but may curve between each of the those points following the distance filed gradient.

The user may drag the point 150 in the horizontal and/or vertical directions, such as along the x and y directions illustrated on the display 134, but the movement is constrained to movement in the z direction. In conventional content editing programs, 2D input, such as movement of the cursor 138 along the display may result in movement in 3D that may make the final end location of the moved point unclear until the character 104 is rotated to another view to illustrate the location of the point. However, by using the editor 124, the movement of the point 150 in FIG. 6B is constrained in the x and y directions and movement is available only in the z direction. In particular, the point 150 can move along a curve normal to the corresponding location on the outer surface 160 of the character 104, but movement in the x or y directions is constrained. In this manner, the x and y locations of the point 150 are predefined by the shell 140, but depth or z location of the point 150 is editable. As the point 150 is moved, the shell 140 at that point moves along with the point 150.

Figure 6C:
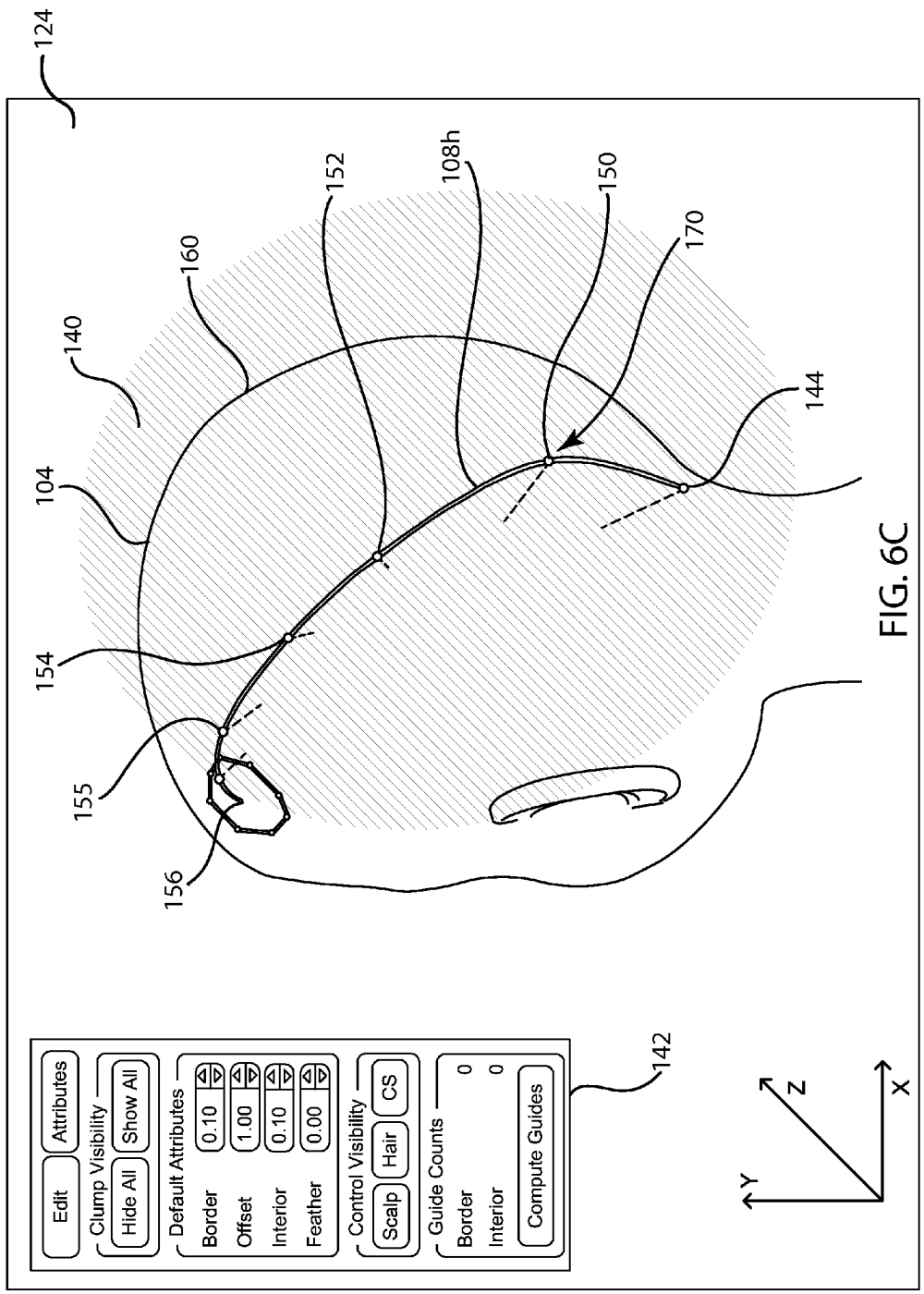
FIG. 6C is a front elevation view of the graphical user interface of FIG. 6A with the point in a third location.

With reference to FIG. 6C, as the user continues to move the point 150 to a third location 170, the hair strand 108a extends from point 150 to the end point 144. As described above with respect to FIG. 6B the point 150 can move in a single direction, in this case the z direction, but the moment in the remaining two dimensions (x and y) is constrained. In other words, the movement of the point 150 in the x and y directions is predetermined by the shell 140. The movement of the point 150 in the z direction is illustrated in FIG. 6C as the reference line 162 extending between the point 150 and the location on the outer surface 160 of the character 104 corresponding to the point is longer than in FIG. 6A. This is because the point 150 has moved away from the object along the path defined by the line 162, extending the spacing distance 148 between the point 150 and the character 104.

Figure 6D:
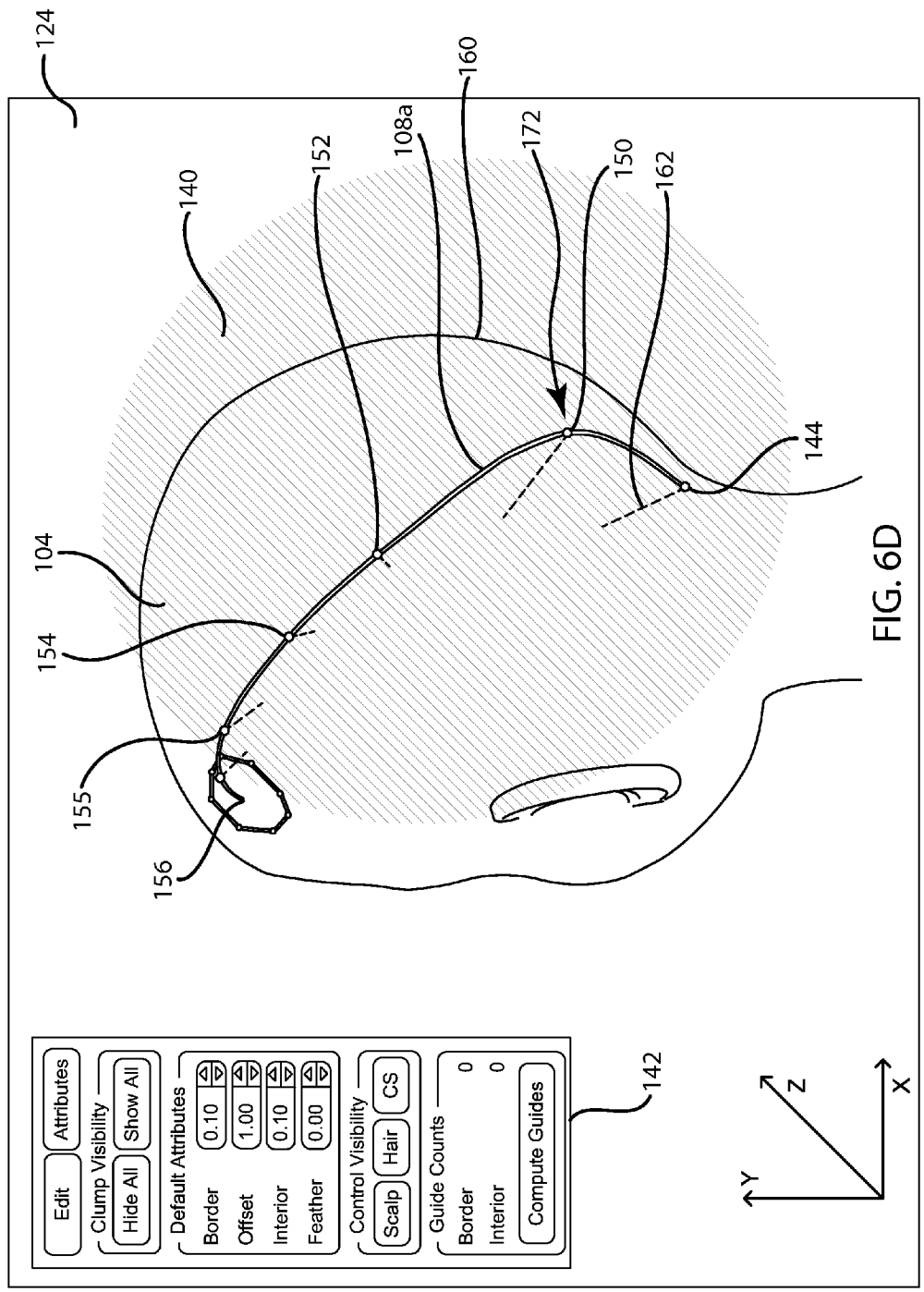
FIG. 6D is a front elevation view of the graphical user interface of FIG. 6A with the point in a fourth location.
Figure 6E:
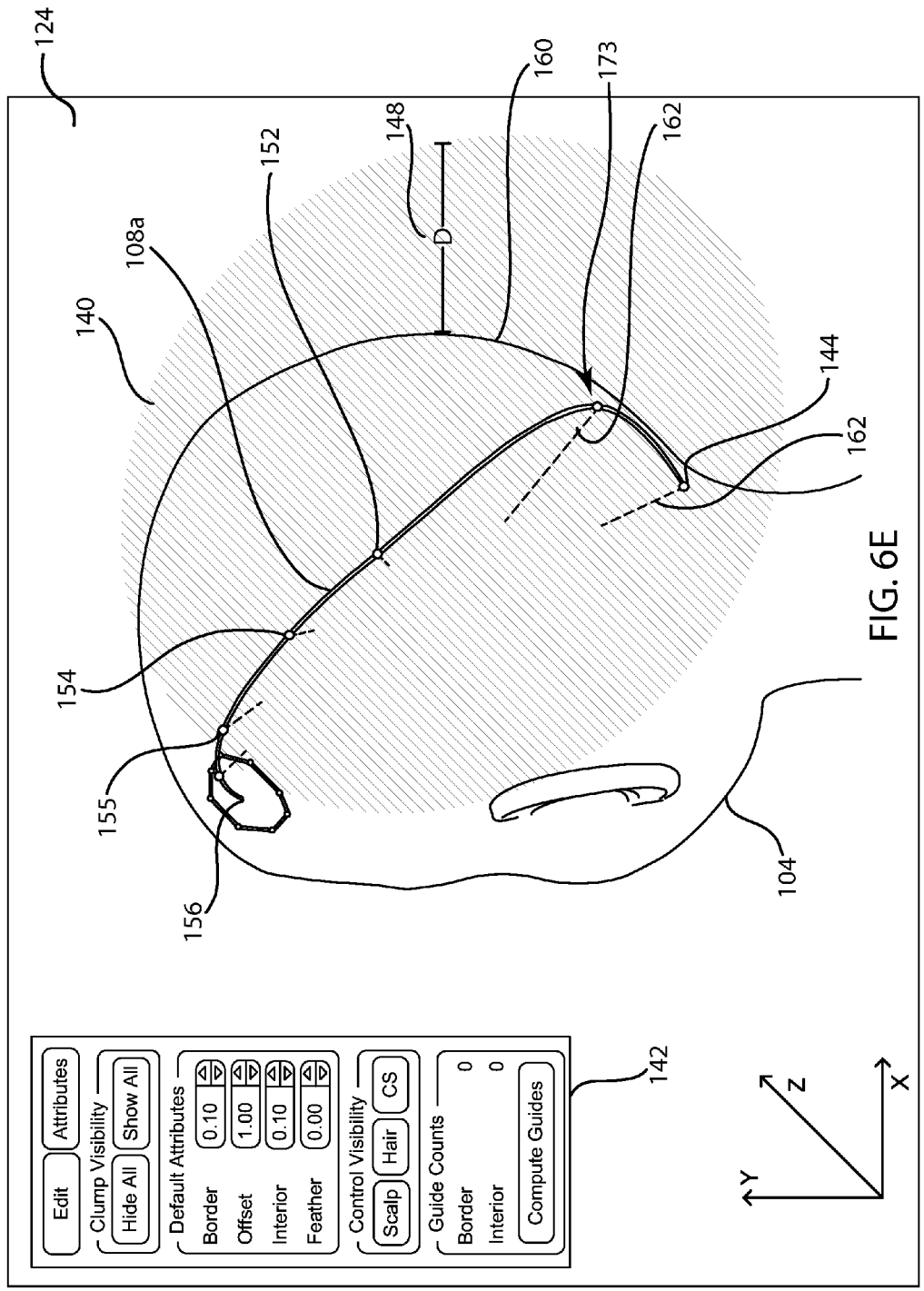
FIG. 6E is a front elevation view of the graphical user interface of FIG. 6A with the point in a fifth location.

Similarly, with reference to FIG. 6D, the point 150 is moved to a fourth location 172, further increasing the distance from the outer surface 160 of the object 104 and the hair strand 108a. The curvature of the hair strand 108a shown between FIGS. 6A and 6D is due to the movement of the point 150 further away from the object than the remaining points. FIG. 6E illustrates the point 150 moved to a fifth location, further increasing the distance from the outer surface of the object. Additionally, comparing FIGS. 6A, 6B, 6C, 6D, 6E the position of the shell 140 adjusts to accommodate the changed position of the point 150. In particular, the shell 140 is updated by the processing element 130 between each location 158, 168, 170, 172 of the point 150 along the z axis. Accordingly, the spacing distance 148 defined between the shell 140 and the outer surface 160 of the character 104 increases as the point is moved away from the character. Correspondingly, if the point 150 is moved towards the character, the shell 140 will move closer as well.

Figure 7B:
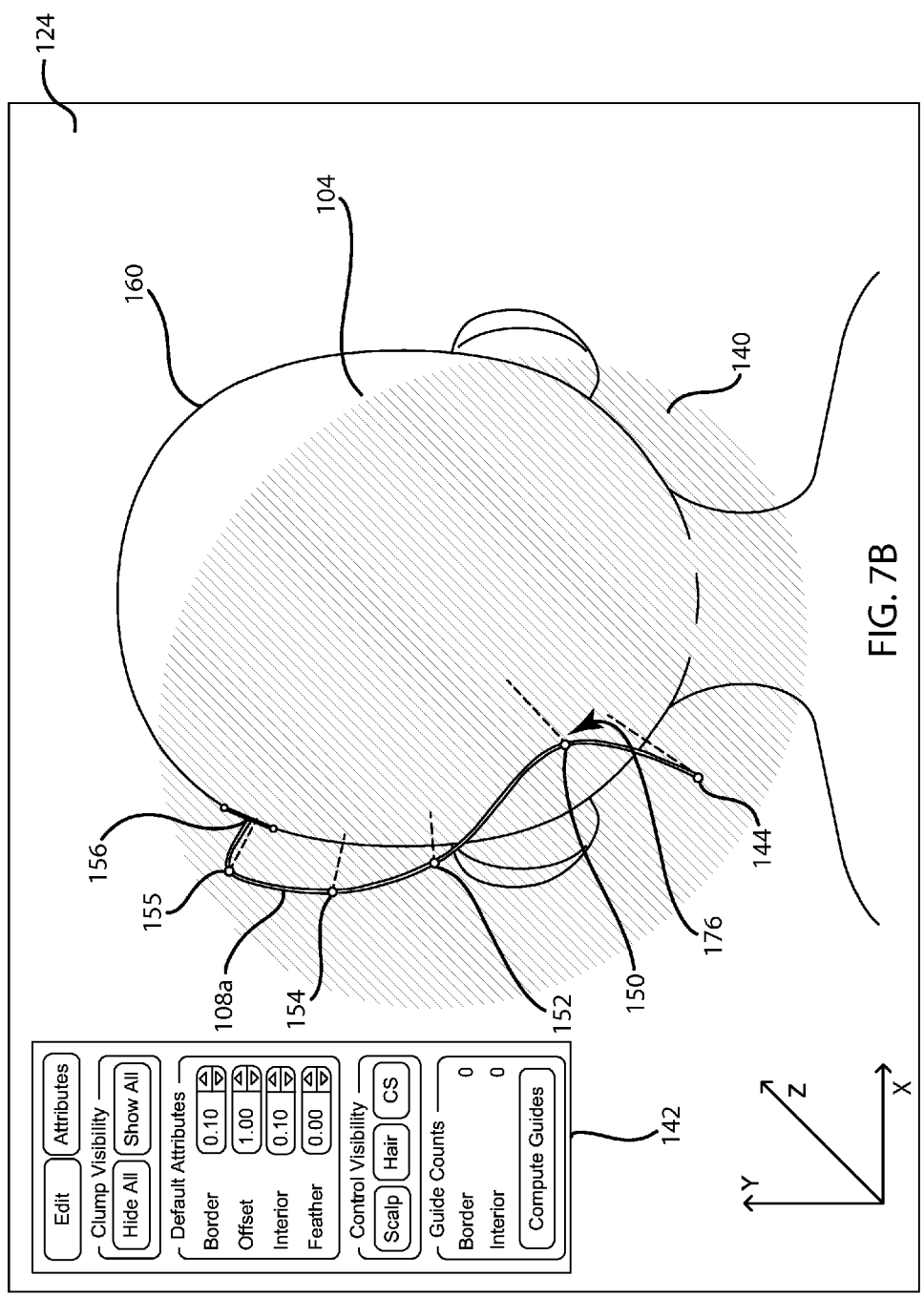
FIG. 7B is a front elevation view of the graphical user interface of FIG. 7A with the point in a second location.

Examples of a point being moved in 2D using the editor 124 will now be discussed. FIGS. 7A-E illustrate views of the editor GUI while a point is moved from a first location to a second location during 2D mode. With reference to FIG. 7A, the 3D character is illustrated in a perspective view with the reference shell 140 transposed on top of the character 104. As shown in FIG. 7A, the reference shell 140 extends past the outer surface 160 of the character 104 by the spacing distance 148. A selected hair strand 108a extends from an anchor point 156 towards an end point 144. In this example, the hair strand 108a includes a plurality of points 150, 152, 154 between the anchor point 156 and the end point 144. The selected point 150 in FIG. 7A is positioned at a first location 174. Each point may include a reference line 162 extending between the point 144, 150, 152, 154, 155 and the outer surface 160 of the character 104. The number of points and reference lines may be varied as desired.

With reference to FIG. 7B, the selected point 155 is moved during a 2D motion mode. For example, while in the 2D mode, the user 144 may drag the point 155 from the first location 174 illustrated in FIG. 7A to a second location 176 as shown in FIG. 7B. The user may drag the point 155 in the horizontal and/or vertical directions, such as along the x and y directions illustrated on the display 134. In conventional content editing programs, 2D input, such as movement of the cursor 138 along the display may result in movement in 3D that may make the final end location of the moved point unclear until the character 104 is rotated to another view to illustrate the location of the point. However, by using the editor 124, the movement of the point 150 in FIG. 7B is constrained in the z direction. In particular, the point 144 can move along the x and y axes but travels along the shell 140 in the z axis, which defines the depth location of the point 150. Because the point 150 is fixed to the shell 140, the point 150 can move in the z direction (as it corresponds to the topography of the shell 140), but the movement is defined by the shell 140 and thus readily apparent to the user.

Figure 7C:
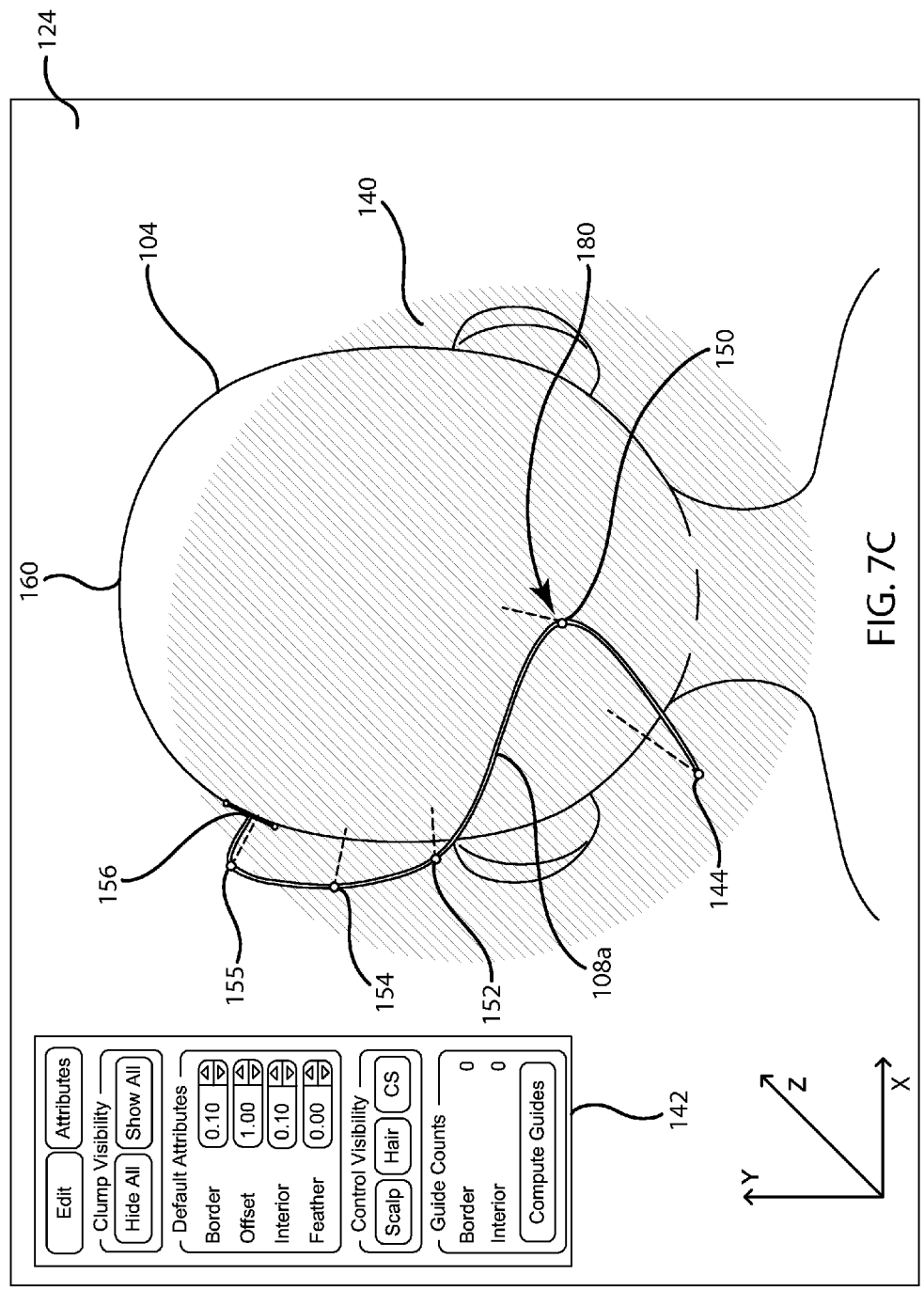
FIG. 7C is a front elevation view of the graphical user interface of FIG. 7A with the point in a third location.

With reference to FIG. 7C, as the user continues to move the end point 150 to a third location 178, the hair strand 108a curves around from point 150 to the end point 144. As described above with respect to FIG. 7B the point 150 can move in two dimensions, but the moment in the third dimension (in this case the z axis) is constrained. In other words, the movement of the point 150 in the z axis is predetermined by the shell 140. This allows the point 150 to move in the z direction when in 2D mode, but that movement is determined by the topography of the shell 140.

Figure 7D:
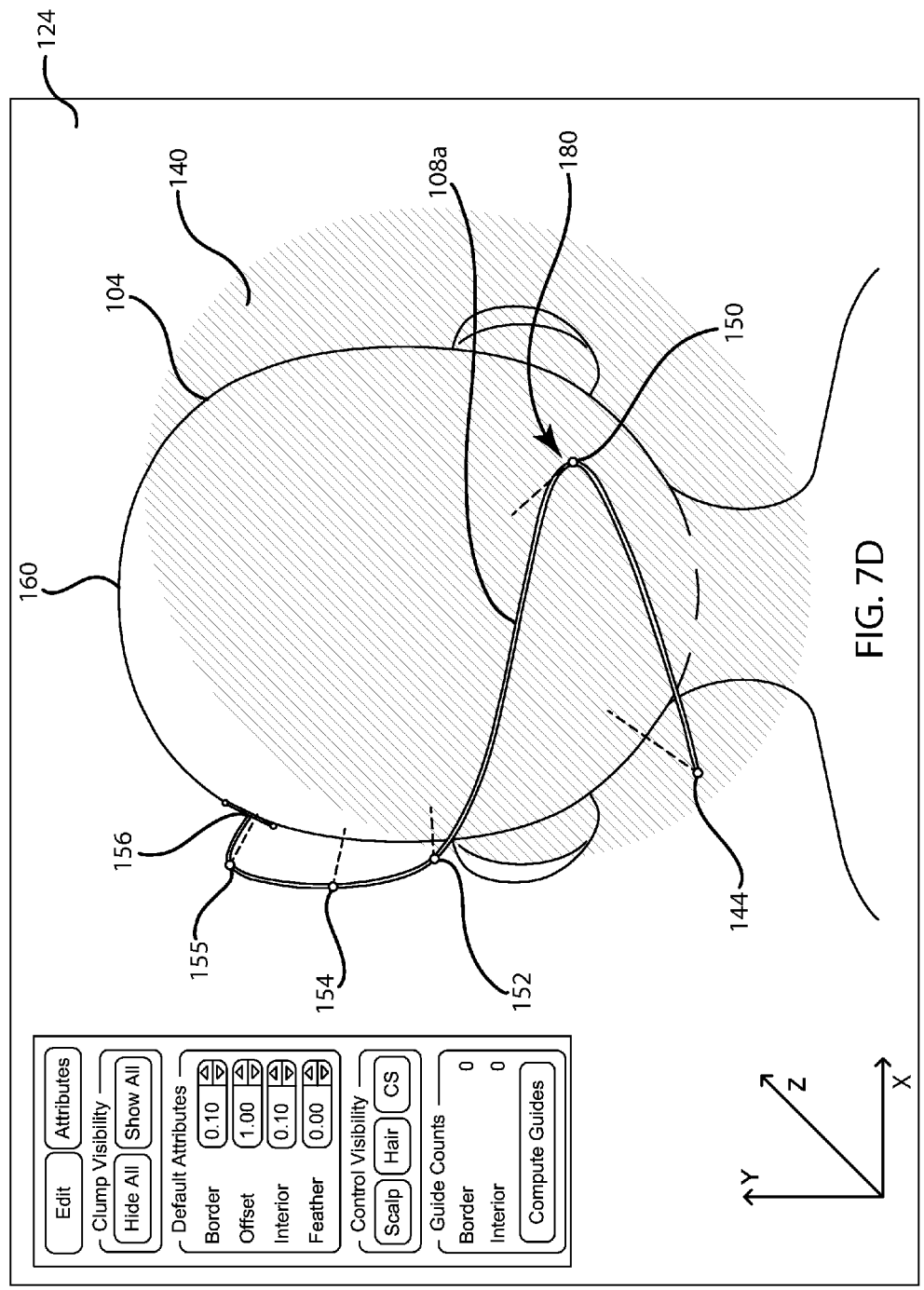
FIG. 7D is a front elevation view of the graphical user interface of FIG. 7A with the point in a forth location.
Figure 7E:
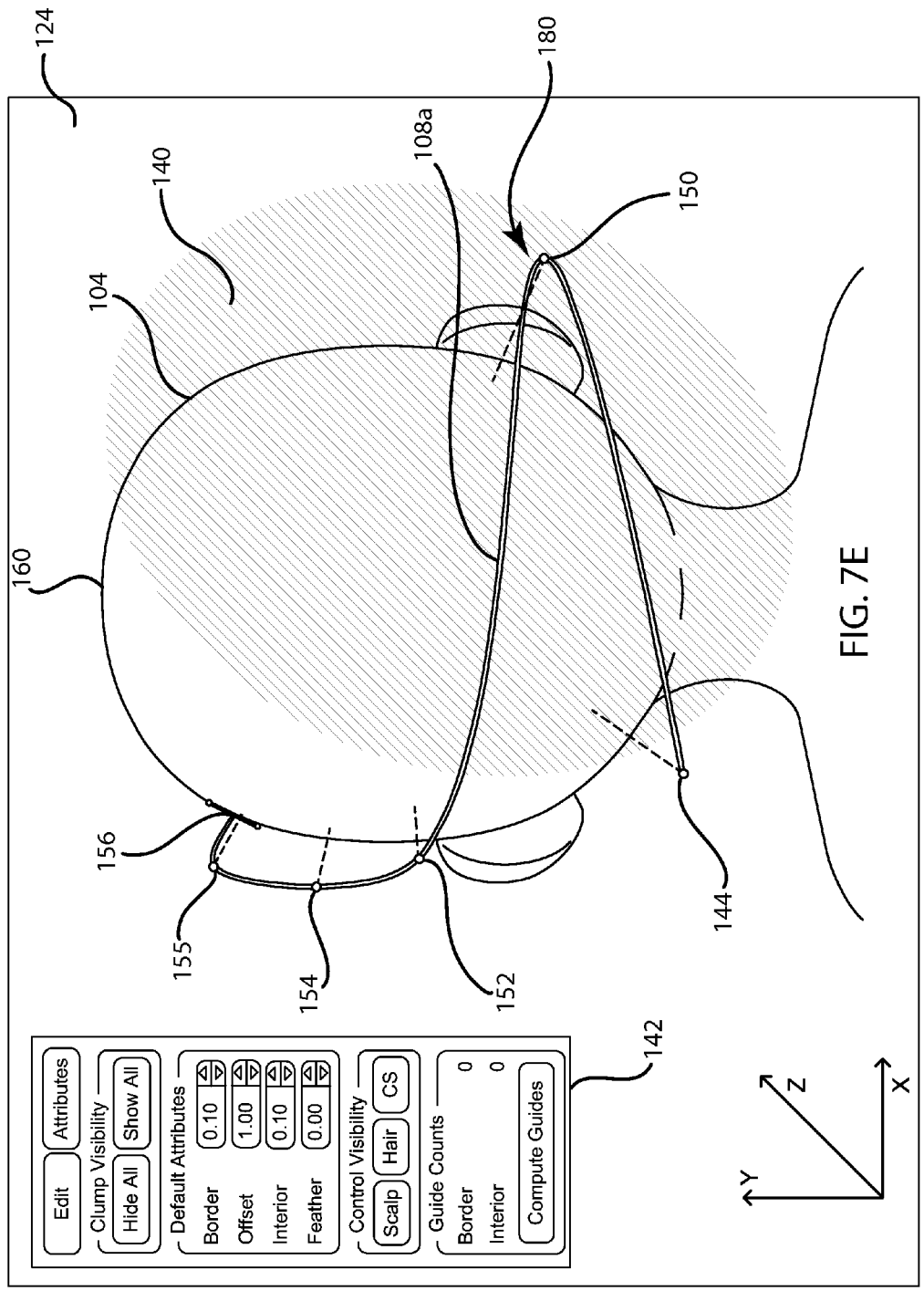
FIG. 7E is a front elevation view of the graphical user interface of FIG. 7A with the pint in a fifth location.

With reference to FIGS. 7D and 7E, the point 150 is moved to a fourth location 1870 and then a fifth location 182, further increasing the curvature of the hair strand 108a between the end point 144 and point 150. In this example, the fifth location 182 may be the final location for the point 150, defining a strand 108a having a curved end portion.

It should be noted that although the above examples illustrated in FIGS. 7A-7E have been discussed with a particular point, the editor 124 may be used to modify two or more points at a particular time. For example, multiple points 144, 150, 152, 154, 155 may be selected and dragged simultaneously. In this example, each point 144, 150, 152, 154, 155 remain constrained to the their respective offsets defined by the shell 140. In another example, given a preexisting curve, the points of the curve may be redrawn through a sketching gesture (e.g., moving the cursor 138 in a pattern), as the curve is redrawn each of the points in the curve remain offset from the character 104 by the shell 140.

CONCLUSION

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method for editing content including at least one three-dimensional object, comprising:
   determining by a processing element one or more constraints;
   rendering by the processing element a shell defining an offset distance to the three-dimensional object corresponding to the one or more constraints, wherein rendering the shell comprises calculating by the processing element a distance field from an outer surface of the three-dimensional object;
   receiving a user input to a point related or connected to the three-dimensional object; and
   moving the point in a direction corresponding to the user input; wherein
   the movement of the point is limited in at least one direction by the shell, such that in a first mode the point can move only along an outer surface of the shell and in a second mode the point can move only along the distance field between the outer surface of the three dimensional object and the shell.

2. The method of claim 1, further comprising displaying by a display in communication with the processing element the content, wherein the content comprises the three dimensional object and the point.

3. The method of claim 2, further comprising overlaying the shell over at least a portion of the three-dimensional object.

4. The method of claim 3, wherein the shell is partially transparent and the at least a portion of the three-dimensional object is visible beneath the shell.

5. The method of claim 4, wherein the shell is invisible to a user.

6. The method of claim 1, wherein the user input is a one-dimensional or a two-dimensional gesture.

7. The method of claim 1, wherein the shell substantially parallels a plurality of features of the three-dimensional object.

8. The method of claim 1, wherein the shell substantially follows a shape of an outer surface of the three-dimensional object.

9. A system for modifying one or more characteristics of a three-dimensional character comprising:
   at least one input device configured to detect a user input;
   a display in communication with the at least one input device and configured to display the three-dimensional character and an output element, wherein the output element corresponds to the user input to the at least one input device; and
   a processing element in communication with the at least one input device and the display, the processing element configured to:
   render a relative surface approximately corresponding to an outer surface topography of the three-dimensional character; and
   move an element connected to or related to the three-dimensional character in response to the user input; wherein in a first mode, the movement of the element is limited to movement on the relative surface and in a second mode, the relative surface limits the movement of the element in two directions, such that only movement between the three-dimensional character and the relative surface is possible.

10. The system of claim 9, wherein the relative surface is a three-dimensional grid surrounding at least a portion of the three-dimensional character.

11. The system of claim 10, wherein the relative surface directly corresponds to a topography of the three-dimensional character.

12. The system of claim 9, wherein the display displays the relative surface.

13. The system of claim 12, wherein the relative surface is displayed overlaying at least a portion of the three-dimensional character.

14. The system of claim 13, wherein the relative surface is at least partially transparent.

15. The system of claim 9, wherein the user input is at least one of a one-dimensional input or a two-dimensional input.

16. A graphical editing method comprising:
determining an element connected to a three-dimensional object to be edited;
calculating by a processor a reference shell having a topography corresponding to the three-dimensional object and offset from the three-dimensional object by an offset distance;
displaying by a display the reference shell and the three-dimensional object; and
moving the element in response to a user input, wherein
in a two-dimensional condition, the movement of the element in response to the user input is limited to two dimensions relative to the three-dimensional object, wherein movement of the element is restricted to along a portion of the reference shell; and
in a one dimensional condition, movement of the element in response to the user input is limited to one dimension relative to the three-dimensional object.

17. The graphical editing method of claim 6, wherein the offset distance determines the distance from the three-dimensional object of the element.

18. The graphical editing method of claim 16, wherein the display overlays the reference shell over the three-dimensional object.

* * * * *